(12) United States Patent
Theobold et al.

(10) Patent No.: US 12,553,464 B2
(45) Date of Patent: Feb. 17, 2026

(54) HANDLE FOR A LATCH RELEASE CABLE

(71) Applicant: RB Distribution, Inc., Colmar, PA (US)

(72) Inventors: Daniel Theobold, Center Valley, PA (US); Casey West, Thornton, PA (US); Devin Swift, Drexel Hill, PA (US); Eric Tryson, Willow Grove, PA (US)

(73) Assignee: RB Distribution, Inc., Colmar, PA (US)

( * ) Notice: Subject to any disclaimer, the term of this patent is extended or adjusted under 35 U.S.C. 154(b) by 0 days.

(21) Appl. No.: 18/756,453

(22) Filed: Jun. 27, 2024

(65) Prior Publication Data
US 2025/0092907 A1    Mar. 20, 2025

Related U.S. Application Data

(60) Provisional application No. 63/583,427, filed on Sep. 18, 2023.

(51) Int. Cl.
*F16C 1/14* (2006.01)
*F16G 1/00* (2006.01)

(52) U.S. Cl.
CPC ............... *F16C 1/145* (2013.01); *F16G 1/00* (2013.01)

(58) Field of Classification Search
CPC .... F16C 1/145; F16C 1/14; F16C 1/16; F16C 1/18; F16G 11/106; F16B 37/0842
See application file for complete search history.

(56) References Cited

U.S. PATENT DOCUMENTS

| | | | | |
|---|---|---|---|---|
| 1,520,716 | A | * 12/1924 | Judd | F16G 11/106 24/134 P |
| 1,950,317 | A | * 3/1934 | Luneburg | F16C 1/14 269/254 R |
| 3,476,163 | A | * 11/1969 | Tinnerman | F16B 37/02 411/929 |
| 3,912,356 | A | 10/1975 | Johansson | |
| 4,600,344 | A | * 7/1986 | Sutenbach | F16B 37/0842 411/908 |
| 6,050,841 | A | 4/2000 | Chen | |
| 9,284,974 | B2 | * 3/2016 | Iwahara | F16B 37/0857 |
| 2007/0240902 | A1 | 10/2007 | Tapper | |
| 2018/0335072 | A1 | * 11/2018 | Wilson | F16B 37/0842 |
| 2020/0256424 | A1 | 8/2020 | Brezzi et al. | |

FOREIGN PATENT DOCUMENTS

| | | | |
|---|---|---|---|
| DE | 102022114488 A1 | * 10/2023 | ......... F16B 37/0857 |
| EP | 3913237 A4 | * 11/2021 | ............. F16B 2/243 |
| FR | 700861 A | * 3/1931 | |
| KR | 1020200118649 A | 10/2020 | |
| WO | WO-9908006 A1 | * 2/1999 | ............. F16B 27/00 |

\* cited by examiner

*Primary Examiner* — Daniel D Yabut
(74) *Attorney, Agent, or Firm* — Volpe Koenig

(57) ABSTRACT

A handle for a cable, the handle including a vertical portion extending along an axis and having a side surface with a portion thereof parallel with the axis and an end surface generally perpendicular to the axis. A blind bore is defined in the vertical portion extending from the end surface with an axis substantially parallel to the axis. A recess is defined in the side surface extending substantially perpendicular to the axis and intersecting with the blind bore. A push nut has a base with an opening therethrough and at least one gripping member extending into the opening. The push nut is positioned in the recess such that the opening and the gripping member are aligned with the blind bore.

11 Claims, 4 Drawing Sheets

HANDLE FOR A LATCH RELEASE CABLE

This application claims the benefit of U.S. Prov. Appln. No. 63/583,427, filed Sep. 18, 2023, the contents of which are incorporated herein by reference.

BACKGROUND

Latch release cables are used in a number of applications where remote operation of the latch is desired. The term cable is used herein to include a wire, wire rope, cord, rod or the like. These latch release mechanisms are frequently found in vehicles for hood, trunk, and fuel door releases. In many of these uses, a handle that is gripped to release the latch is over molded on the cable. Over time, the handle can become loose, pull off of the cable, or be broken. Attempts to repair the release mechanism often use a replacement handle that is secured to the cable by a fastener that engages threads in the replacement handle and compresses against the cable. Potential failure points with this approach are that the fastener engagement between the replacement handle and cable creates immediate stress on the handle, and the engagement contact between the fasteners and the cable may not be reliable.

SUMMARY

The present solution provides a handle for a cable, the handle including a vertical portion extending along an axis and having a side surface with a portion thereof parallel with the axis and an end surface generally perpendicular to the axis. A blind bore is defined in the vertical portion extending from the end surface with an axis substantially parallel to the axis. A recess is defined in the side surface extending substantially perpendicular to the axis and intersecting with the blind bore. A push nut has a base with an opening therethrough and at least one gripping member extending into the opening. The push nut is positioned in the recess such that the opening and the gripping member are aligned with the blind bore.

DETAILED DESCRIPTION

Figure 1:
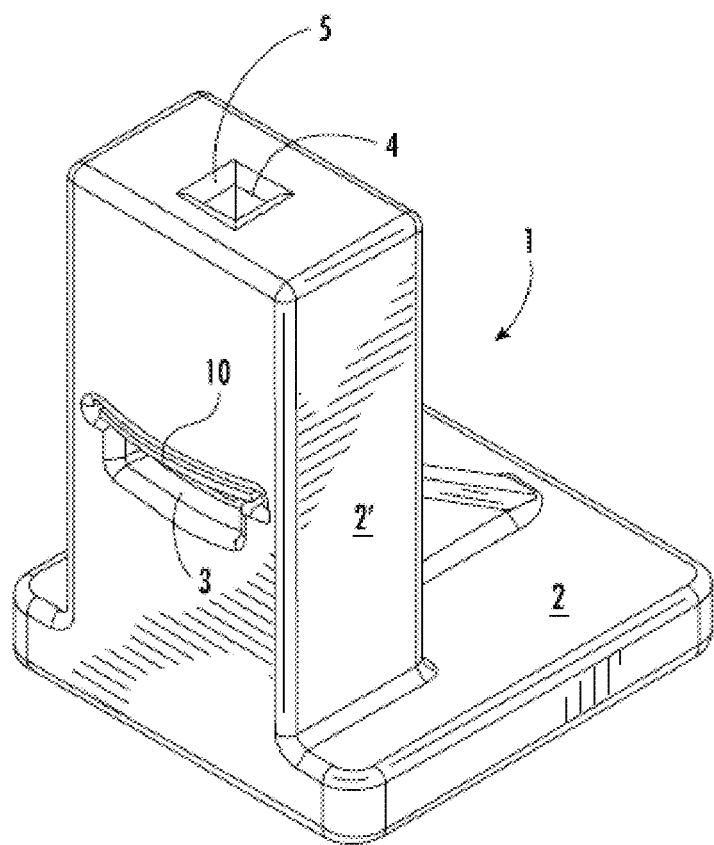
FIG. 1 is a perspective view of a handle in accordance with an embodiment of the disclosure.

A detailed description of the illustrative handle 1 will be provided with reference to the drawings. References to orientation herein are for the purpose of understanding only and are not intended to limit the structure to a particular orientation during use. In FIG. 1, it can be seen that the illustrative handle 1 is formed as a unitary structure including a planar portion 2 and a vertical portion 2'. While the illustrative handle 1 includes a rectangular vertical portion 2' and a cantilevered rectangular planar portion 2 extending therefrom, the handle 1 configuration is not limited to such. As one example, the vertical portion may be centered relative to planar portion. As another example, the portions may have other than rectangular configurations, e.g. the vertical portion may be cylindrical and the planar portion circular. As yet another example, the handle may include only the vertical portion with a configuration that facilitates gripping, e.g. a sphere or a cylinder with a circumferential groove.

Figure 2:
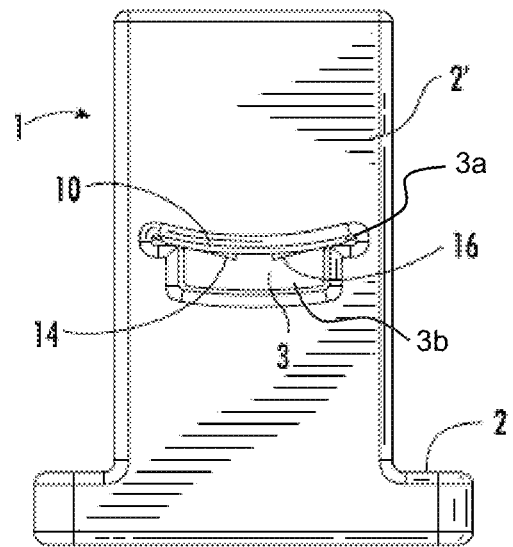
FIG. 2 is a plan view of the rear portion of the handle.
Figure 3:
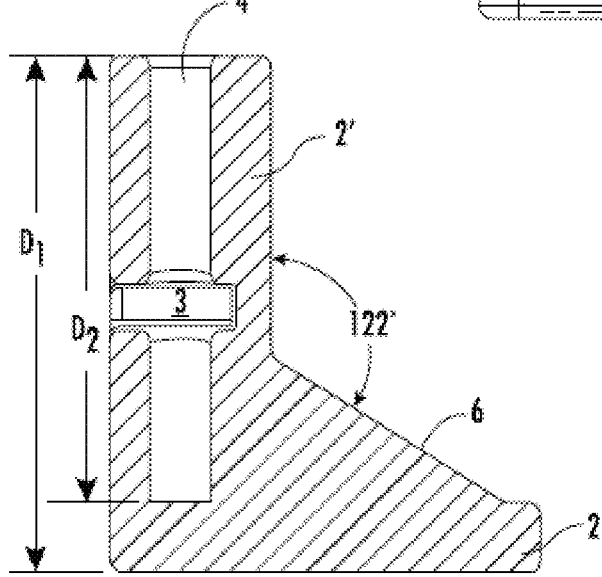
FIG. 3 is a section view along the line 3-3 in FIG. 1.
Figure 4:
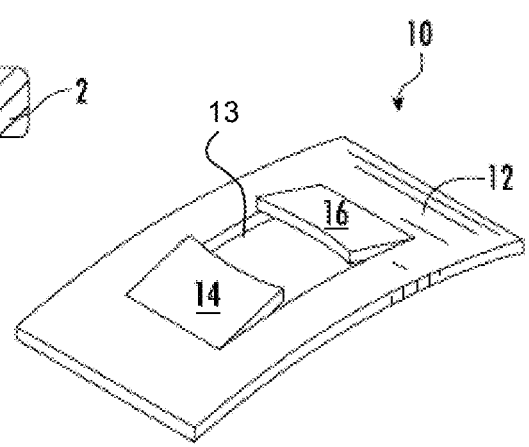
FIG. 4 is a perspective view of a push nut in accordance with an embodiment of the disclosure.

As shown in FIGS. 1-3, a recess 3 extends into the vertical portion 2' from a side surface thereof and preferably extends beyond a central axis of the vertical portion 2'. In the illustrated embodiment, the recess 3 includes a slot portion 3a with an open area portion 3b below and in communication with the slot portion 3a. The slot portion 3a may have an arcuate configuration. With this configuration, the slot portion 3a is configured to slidably receive a base portion 12 of a push nut 10. As shown in FIG. 4, the push nut 10 includes the base portion 12 having an opening 13 therethrough. A pair of opposed prongs or grippers 14 and 16 extend from the base portion 12 into the opening 13, preferably with a space therebetween. While a pair of grippers is illustrated, it is contemplated that more or fewer grippers may be utilized. The recess 3 is configured such that the grippers 14 and 16 extend into the open area portion 3b and can further extend therein the article to be gripped by the push nut is inserted through the opening 13. The recess 3 may be configured such that the push nut 10 is snap fit therein, however, such may not be required as the push nut 10 still be retained upon insertion of the cable, as will be described in more detail below.

With reference to the section view in FIG. 3, a bore 4 extends into the vertical portion 2' substantially perpendicular to the recess 3 such that the bore 4 intersects the recess 3 and extends beyond the recess 3. As illustrated, the handle 1 has an overall length of $D_1$ and the bore has a maximum length of $D_2$. The maximum bore length of $D_2$ is elected to assure that the free end of the cable extends beyond the push nut 10 but is short of the base or planar portion 2 (see FIG. 6). Additionally, the diameter of the bore 4 is preferably selected to be only slightly larger than the diameter of the cable to prevent the cable from spinning within the bore 4. As shown in FIG. 1, the opening of the bore 4 may be formed with a chamfer 5 which aids insertion of the cable into the bore 4.

As noted, the difference in length between $D_1$ and $D_2$ is selected to avoid weakening the planar portion 2. With reference to FIG. 3, it can be seen that the illustrative handle 1 is formed with an angular portion or gusset 6 joined with both the planar portion 2 and vertical portion 2'. This angular portion or gusset 6 serves as a strengthening rib for distributing stress on the handle 1 during use.

Figure 5:
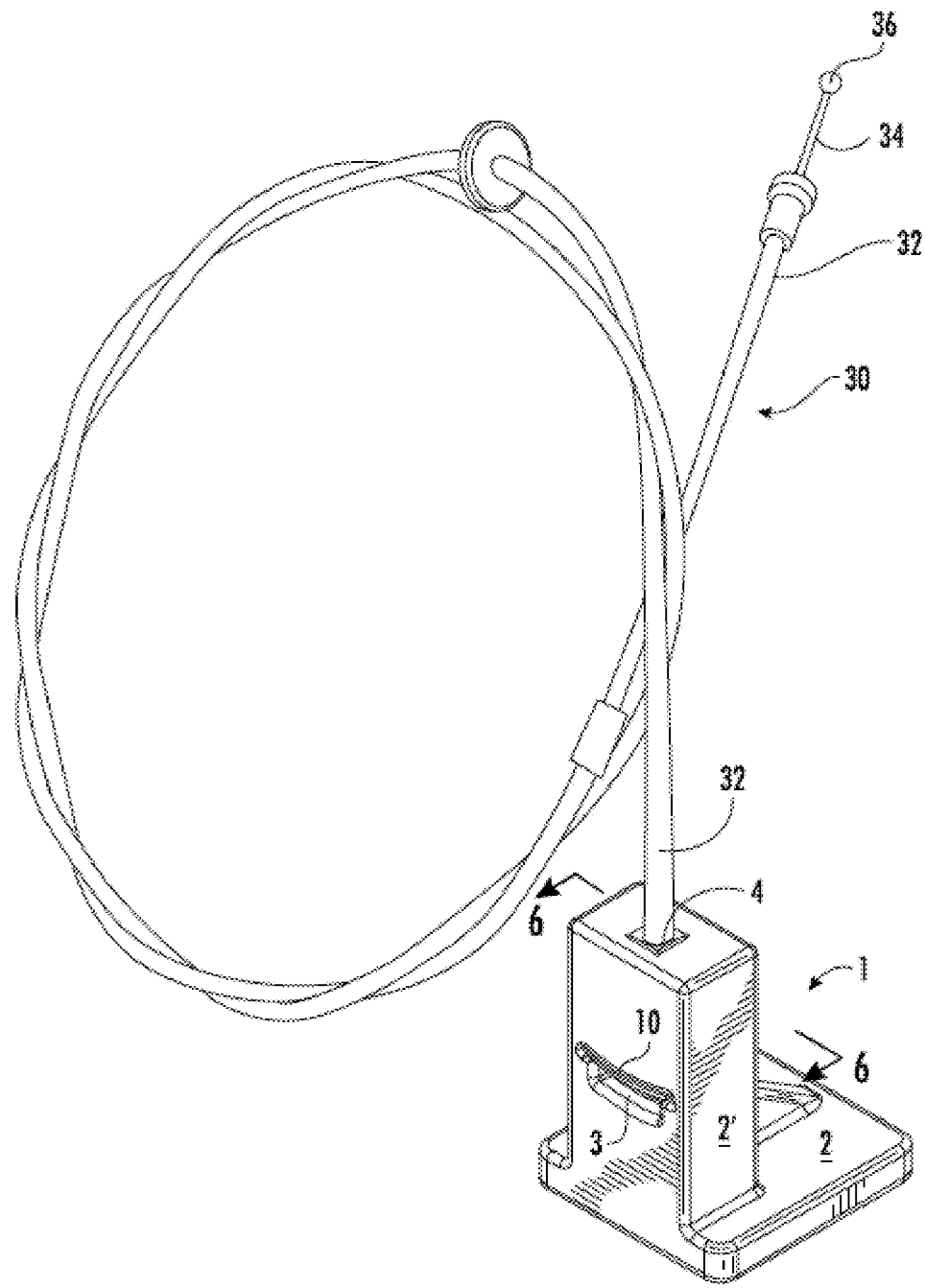
FIG. 5 illustrates insertion of a cable into the replacement handle.
Figure 6:
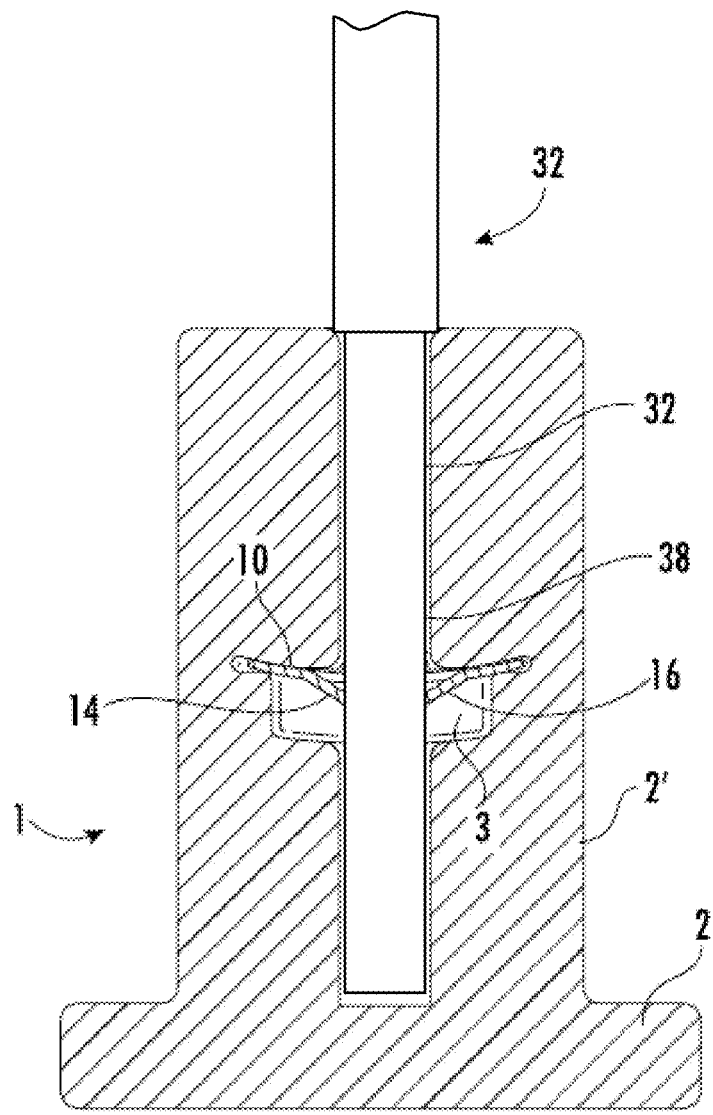
FIG. 6 is a section along the line 6-6 that illustrates the connection of the cable and push nut within the handle.

As shown in FIGS. 5 and 6, a typical latch release assembly 30 has a cable 34 extending from a latch connection end 36 to a handle end 38. In some applications, an outer sheath 32 extends over a portion of the cable 34 and is typically fastened in some manner to keep it in a stationary location while the cable 34 is free to move within the stationary sheath 32. The handle end 38 of the cable 34 extends beyond the sheath 32 and is inserted into the handle 1 through the bore 4. The handle end 38 passes through the grippers 14 and 16 in push nut 10. As explained above, the grippers 14 and 16 extend in the direction of insertion toward the planar portion 2. Due to the angle and bite of the grippers 14 and 16, the inserted cable 34 is prevented from moving in the opposite direction relative to the handle 1. Because the push nut 10 is contained internally and contacts the cable end 38 upon insertion, the disclosed handle 1 does not require any tool for connecting the handle 1 to the cable 30. In use, pulling the handle 1 to release a latch pulls the cable 34 through the sheath 32 and actuates the latch.

What is claimed is:

1. A handle for a cable, the handle comprising:
   a vertical portion extending along an axis and having a side surface with a portion thereof parallel with the axis and an end surface generally perpendicular to the axis;
   a blind bore defined in the vertical portion extending from the end surface with an axis substantially parallel to the axis and configured to receive the cable;
   a recess defined in the side surface extending substantially perpendicular to the axis and intersecting with the blind bore; and
   a push nut having a base with an opening therethrough and at least one gripping member extending into the opening, the push nut positioned in the recess such that the opening and the at least one gripping member are aligned with the blind bore such that the gripper is configure to engage the cable once inserted into the blind bore.

2. The handle of claim 1, where a planar handle portion is formed integral with the vertical portion opposite the end surface.

3. The handle of claim 2, wherein the planar portion and the vertical portion are joined by an angular portion.

4. The handle of claim 3, wherein the angular portion is a rib.

5. The handle of claim 2, wherein the planar portion has a base that is spaced from the end surface of the vertical portion by a distance $D_1$.

6. The handle of claim 5, wherein the vertical bore has a depth of $D_2$ and $D_2$ is less than $D_1$.

7. The handle of claim 1, wherein the recess includes a slot portion configured to receive the push nut base.

8. The handle of claim 7, wherein the slot potion and the push nut base have an arcuate configuration.

9. The handle of claim 7, wherein the recess further includes an open area portion extending from the slot portion and configured to receive the at least one gripping member.

10. The handle of claim 1, wherein the blind bore extends beyond the recess.

11. A handle for use on a latch release cable, the handle comprising:
    a gripper portion;
    a projecting portion that extends from the gripper portion; and
    an angular portion that is connected with both the gripper portion and the projecting portion;
    the projecting portion extends away from the gripper portion to define a free end,
    the projecting portion has a recess that is spaced from the gripper portion and configured to receive a push nut,
    a blind bore extends from the free end toward a user portion and is aligned to intersect the recess, and
    a push nut in the projecting portion recess is positioned so a gripper associated with the push engages the latch release cable inserted in the bore and secures the handle on the latch release cable.

* * * * *